US012795303B2

(12) United States Patent
Oliver, III

(10) Patent No.: US 12,795,303 B2
(45) Date of Patent: Nov. 10, 2026

(54) CONICAL ELECTROSTATIC SPEAKER

(71) Applicant: Robert Grant Oliver, III, Hampton, VA (US)

(72) Inventor: Robert Grant Oliver, III, Hampton, VA (US)

( * ) Notice: Subject to any disclaimer, the term of this patent is extended or adjusted under 35 U.S.C. 154(b) by 741 days.

(21) Appl. No.: 17/803,355

(22) Filed: May 31, 2022

(65) Prior Publication Data

US 2023/0388720 A1 Nov. 30, 2023

(51) Int. Cl.
*H04R 19/02* (2006.01)
*H04R 7/12* (2006.01)

(52) U.S. Cl.
CPC ............... *H04R 19/02* (2013.01); *H04R 7/12* (2013.01); *H04R 2201/02* (2013.01); *H04R 2400/11* (2013.01)

(58) Field of Classification Search
CPC ...... H04R 19/00; H04R 19/02; H04R 19/013; H04R 7/12; H04R 2201/02; H04R 2201/021; H04R 2400/11; H04R 2217/01
USPC .................................................. 381/191, 116
See application file for complete search history.

(56) References Cited

U.S. PATENT DOCUMENTS

2005/0147265 A1* 7/2005 Smits ..................... H04R 19/02 381/396
2012/0237069 A1* 9/2012 Harman ................. H04R 19/02 381/336

* cited by examiner

*Primary Examiner* — Ahmad F. Matar
*Assistant Examiner* — Sabrina Diaz
(74) *Attorney, Agent, or Firm* — Jeffrey F. Riddle; RIDDLE & HANNA

(57) ABSTRACT

An electrostatic speaker driver having specially configured stators and diaphragm for multi-directional sound projection is described. The stators and diaphragm may be frustoconical for example. Stators may have apertures to enable sound generated by vibration of the diaphragm to project in desired directions. The speaker drivers may stand alone, or alternatively, may be part of a speaker assembly including one or more speaker drivers.

7 Claims, 2 Drawing Sheets

CONICAL ELECTROSTATIC SPEAKER

FIELD OF THE INVENTION

This invention relates in general to speaker drivers of the electrostatic type using a vibratable diaphragm.

BACKGROUND OF THE INVENTION

Electrostatic speaker drivers converting electrical signals into audible sound have a diaphragm stretched taut between charged plates called stators. Appropriate charging of the diaphragm causes it to move toward one of the stators. Displacement of the diaphragm in this manner imparts vibrations to ambient air at the diaphragm. These vibrations are audible as sound.

Currently, stators are planar. Sound radiates perpendicularly initially from the diaphragm, with most acoustic energy projected in a direction parallel to displacement of the diaphragm. Although a driver or an associated speaker can be aimed or directed in a desired direction, dispersion of sound in multiple directions could be enhanced given appropriate configuration of the stators and diaphragm.

SUMMARY OF THE INVENTION

The present invention addresses the above stated need by providing an electrostatic speaker driver configured to deliver three dimensional projection of sound. To this end, both the diaphragm and also surrounding stators are non-planar, and more particular, may be conical or partially so. Stators have apertures to enable escape and propagation of sound.

Various advantages of this invention will become apparent to those skilled in the art from the following detailed description of the preferred embodiment, when read in light of the accompanying drawings.

BRIEF DESCRIPTION OF THE DRAWINGS

Various features and attendant advantages of the present invention will become more fully appreciated when considered in view of the accompanying drawings, in which like reference characters designate the same or similar parts and/or features throughout the several views, and wherein.

DETAILED DESCRIPTION OF THE PREFERRED EMBODIMENT

Figure 1:
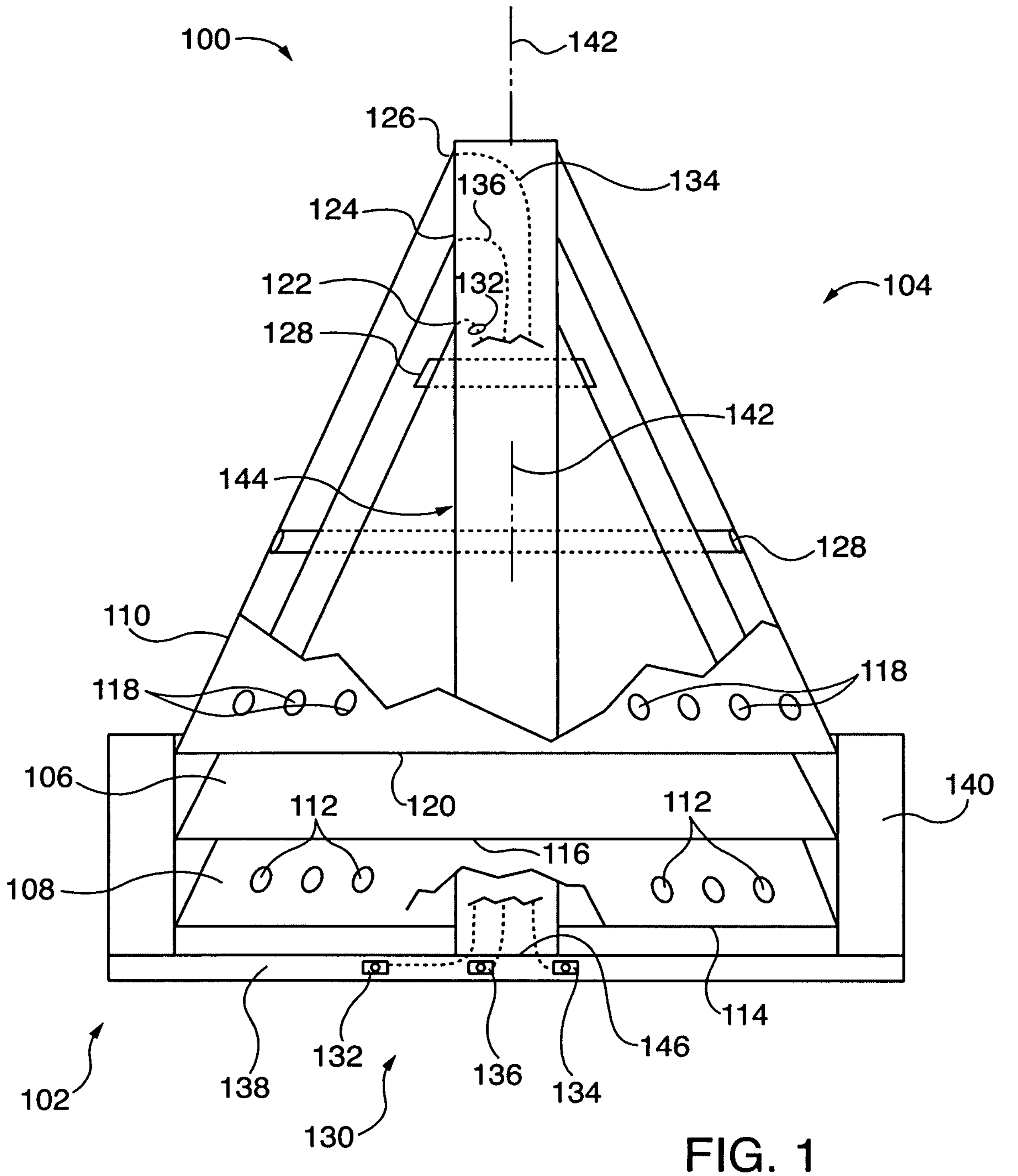
FIG. 1 is a diagrammatic representation of an electrostatic speaker driver, according to at least one aspect of the disclosure.

Referring now to the drawings, there is illustrated in FIG. 1 an electrostatic speaker driver 100 comprising a frame 102 and a non-planar speaker diaphragm assembly 104 fixed to frame 102. Speaker diaphragm assembly 104 may comprise a diaphragm 106, a non-planar first stator 108 located ahead of diaphragm 106, and a non-planar second stator 110 located behind diaphragm 106. First stator 108 may have apertures 112 therethrough for passing sound to an exterior of first stator 108, and a proximal end 114 fixed to frame 102. Diaphragm 106 has a proximal end 116 fixed to frame 102 proximate proximal end 114 of first stator 108. Second stator 110 has apertures 118 therethrough for passing sound to an exterior of second stator 110, and a proximal end 120 fixed to frame 102 proximate proximal end 116 of diaphragm 106.

First stator 108 has a distal end 122 fixed to frame 102. Diaphragm 106 has a distal end 124 fixed to frame 102 proximate distal end 122 of first stator 108. Second stator 110 has a distal end 126 fixed to frame 102 proximate distal end 124 of diaphragm 106.

At least one spar 128 may separate diaphragm 106 from first stator 108 and at least one spar 128 may separate diaphragm 106 from second stator 110.

An electrical system 130 includes a source of positive charge 132 connected to one of first stator 108 and second stator 110, a source of negative charge 134 connected to the other one of first stator 108 and second stator 110, and a source of electrical signals 136 corresponding to sound signals connected to diaphragm 106. Electrical system 130 may include connectors such as jacks, as depicted, to receive signals or operating power from components not included as part of electrostatic speaker driver 100 or an associated speaker (such as speaker 152, to be described hereinafter), or may include these other components, as desired. Electrical system 130 will be understood to include that number, size(s) and arrangements of components to operate as described, even if not all components are expressly shown. Portions of electrical system 130 may include wireless links (not shown).

As seen in FIG. 1, diaphragm 106 moves vertically up or down, responsive to electrical signals corresponding to sounds to be reproduced.

It should be understood that the Drawing Figures are diagrammatic, are not drawn to scale, and are abbreviated in that they do not show every component necessary for operation. Novelty lies principally in configuration of first and second stators 108, 110 and diaphragm 106, so that other components necessary for operation may be taken from known components, and may be arranged by one of ordinary skill in the speaker arts without further instruction herein.

It should be noted at this point that orientational terms such as "lower end", "ahead of", and "behind" refer to the subject drawings as viewed by an observer. The drawing figures depict their subject matter in orientations of normal use, which could obviously change with changes in design, placement within an environment, etc. Therefore, orientations terms must be understood to provide semantic basis for purposes of description, and do not limit the invention or its component parts in any particular way.

Unless otherwise indicated, the terms "first", "second", etc., are used herein merely as labels, and are not intended to impose ordinal, positional, or hierarchical requirements on the items to which these terms refer. Moreover, reference to e.g. a "second" item does not either require or preclude the existence of e.g. a "first" or lower numbered item, and/or e.g. a "third" or higher numbered item.

Frame 102 may comprise a base 138 for resting electrostatic speaker driver 100 on a horizontal surface (not shown) such as a tabletop. Frame 102 could have legs (not shown) in addition to or instead of base 102 if desired. Base 138 may be modified, relocated, or omitted entirely where for example wall or ceiling mounting is contemplated. Frame 102 may include a peripheral wall 140 proximate proximal ends 114, 116, 120 of first stator 108, of diaphragm 106, and of second stator 110. Proximal ends 114, 116, 120 of first stator 108, of diaphragm 106, and of second stator 110 may be coupled to peripheral wall 140. Circular peripheral wall 140 may support and anchor first and second stators 108, 110, and may serve as a guide limiting deviation of diaphragm 106 from concentricity and alignment with respect to first and second stators 108, 110. First and second stators 108, 110 may be sealed against passage of air along their full extent if desired, such as by a bead of adhesive, or by a flexible bellows (neither shown). Alternatively, first and second stators 108, 110 may be tacked periodically along their extent to peripheral wall 140, depending on sound quality considerations. Diaphragm 106 may be similarly sealed if desired, or alternatively, may be coupled to a sleeve (not shown) fitting closely to peripheral wall 140 and being readily slidable therealong.

In the embodiment of FIG. 1, each one of first stator 108 and second stator 110 is curved. First stator 108, diaphragm 106, and second stator 110 may have a common central axis 142. First stator 108 and second stator 110 are parallel to one another.

Figure 2:
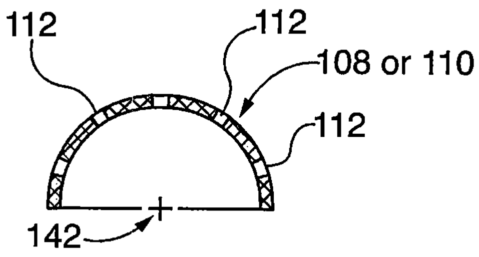
FIG. 2 is a top plan diagrammatic representation of components of an electrostatic speaker driver, according to at least one aspect of the disclosure.
Figure 3:
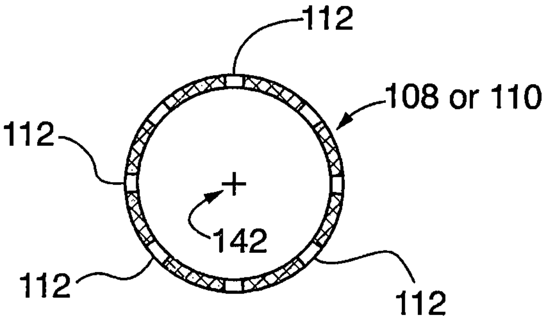
FIG. 3 is a top plan diagrammatic representation of alternative components of an electrostatic speaker driver, according to at least one other aspect of the disclosure.
Figure 4:
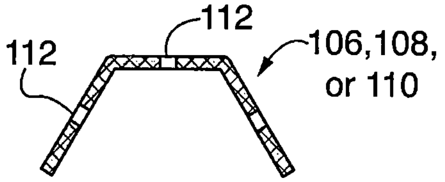
FIG. 4 is a top plan diagrammatic representation of still other alternatives to the components of an electrostatic speaker driver.

Referring also to FIGS. 2, 3, and 4, first stator 108, diaphragm 106, and second stator 110 may each extend at least one hundred eighty degrees around common central axis 142 (FIG. 2). Alternatively, first stator 108, diaphragm 106, and second stator 110 may each extend three hundred sixty degrees around common central axis 142 (FIG. 3). These are examples only. Extent of first and second stators 108, 110 and diaphragm 106 about a circumference or periphery may be any desired fraction of the entirety of the periphery.

The term non-planar will be understood as referring to a member extending beyond a single nominal plane, so as to occupy three dimensional space. In a further embodiment illustrating a non-planar design comprising planar sections, first stator 108, diaphragm 106, and second stator 110 may comprise non-curved sections which together generate a non-planar configuration (FIG. 4). First stator 108, diaphragm 106, and second stator 110 may take on many other configurations (not shown), and may comprise both curved and non-curved sections, may be asymmetric, and may be irregularly contoured, for example.

Referring principally to FIG. 1, frame 102 may include a central member 144 having a cylindrical outer surface coaxial with common central axis 142. First stator 108 and second stator 110 may be frustoconical (as shown in FIG. 1). Distal ends 122, 124, 126 of first stator 108, of diaphragm 106, and of second stator 110 may be coupled to central member 144.

Central member 144 may comprise a hollow tube, to accommodate passage of components of electrical system 130, or if desired, may be non-hollow (i.e., solid). Base 138 may be partially hollow for electrical system 130 or alternatively, solid. Central member 144 may be solidly fixed to base 138 at its lower end 146.

Figure 5:
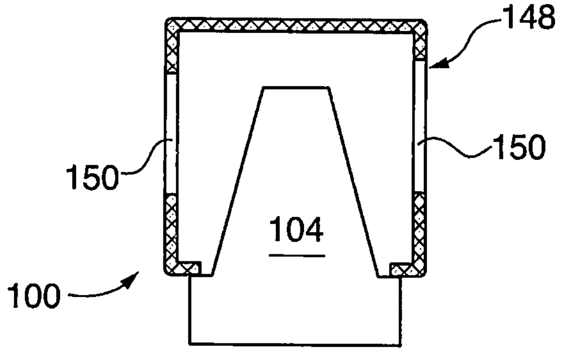
FIG. 5 is a side elevational diagrammatic representation of a further embodiment of a novel electrostatic speaker, showing an optional enclosure, broken away to reveal internal detail.

Referring principally to FIG. 5 but also to FIGS. 1-4, electrostatic speaker driver 100 may further comprise an enclosure 148 (FIG. 5) including walls covering speaker diaphragm assembly 104. Enclosure 148 may include at least one opening 150 for passing sound from stators 108, 110 to an exterior of enclosure 148. With enclosure 148 and if provided with a complete and operable electrical system 130, FIG. 5 will be understood to show a speaker incorporating novel electrostatic speaker driver 100.

Figure 6:
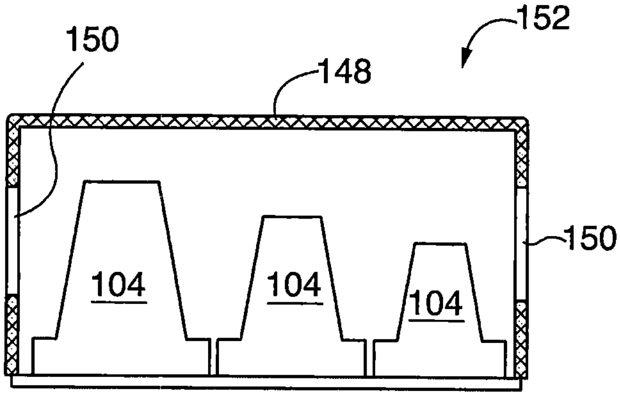
FIG. 6 is a side elevational diagrammatic representation of still a further embodiment of a novel electrostatic speaker, showing plural drivers in one speaker, broken away to reveal internal detail.
Figure 7:
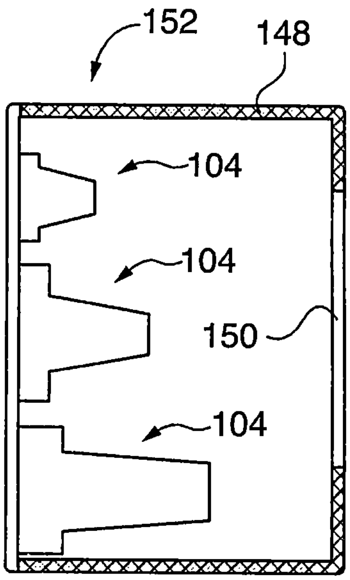
FIG. 7 is a side elevational diagrammatic representation of yet another arrangement of a novel electrostatic speaker, broken away to reveal internal detail.

Referring principally to FIGS. 6 and 7 but also to FIGS. 1-4, speaker diaphragm assembly 104 may be part of a speaker 152, and the speaker includes at least a second speaker diaphragm assembly 104 contained within enclosure 148, supported by frame 102 (in the manner of FIG. 1), and having sound characteristics different from sound characteristics of the first speaker diaphragm assembly 104. In the example of FIG. 6, speaker diaphragm assemblies 104 are horizontally arrayed. In the example of FIG. 7, speaker diaphragm assemblies are vertically arrayed. The arrangements of FIGS. 6 and 7 may be utilized to arrive at speakers 152 containing tweeters, mid-range speakers, woofers, and sub-woofers, for example.

The present invention may be thought of as a speaker driver, a speaker including the novel speaker driver enclosed within an enclosure, or a speaker including at least one novel speaker driver and also at least one other speaker driver in the enclosure. In the latter example, any of the at least one other speaker driver may have or lack a novel speaker driver as defined in the claims which follow.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An electrostatic speaker driver comprising:

a frame;

a non-planar speaker diaphragm assembly fixed to the frame, the speaker diaphragm assembly comprising a diaphragm, a non-planar first stator located ahead of the diaphragm, and a non-planar second stator located behind the diaphragm, wherein the first stator has apertures therethrough for passing sound to an exterior of the first stator, and a proximal end fixed to the frame, the diaphragm has a proximal end fixed to the frame proximate the proximal end of the first stator, and the second stator has apertures therethrough for passing sound to an exterior of the second stator, and a proximal end fixed to the frame proximate the proximal end of the diaphragm, and the first stator has a distal end fixed to the frame, the diaphragm has a distal end fixed to the frame proximate the distal end of the first stator, and the second stator has a distal end fixed to the frame proximate the distal end of the diaphragm, the first stator, the diaphragm, and the second stator have a common central axis, and the first stator and the second stator are parallel to one another and extend at least one hundred eighty degrees around the common central axis; the frame includes a central member having a cylindrical outer surface coaxial with the common central axis, the first stator and the second stator are frustoconical, and the distal ends of the first stator, of the diaphragm, and of the second stator are coupled to the central member, and an electrical system including a source of positive charge connected to one of the first stator and the second stator, a source of negative charge connected to the other one of the first stator and the second stator, and a source of electrical signals corresponding to sound signals connected to the diaphragm, wherein the central member comprises a hollow tube accommodating passage of components of the electrical system.

2. The electrostatic speaker driver of claim 1, further comprising at least one spar separating the diaphragm from the first stator and at least one spar separating the diaphragm from the second stator.

3. The electrostatic speaker driver of claim 1, wherein the first stator, the diaphragm, and the second stator each extend three hundred sixty degrees around the common central axis.

4. The electrostatic speaker driver of claim 1, wherein the frame includes a peripheral wall proximate the proximal ends of the first stator, of the diaphragm, and of the second stator, and the proximal ends of the first stator, of the diaphragm, and of the second stator are coupled to the peripheral wall.

5. The electrostatic speaker driver of claim 1, further comprising an enclosure including walls covering the speaker diaphragm assembly, the enclosure including at least one opening for passing sound from the stators to an exterior of the enclosure.

6. The electrostatic speaker driver of claim 5, wherein the speaker diaphragm assembly is part of a speaker, and the speaker includes at least a second speaker diaphragm assembly contained within the enclosure, supported by the frame, and having sound characteristics different from sound characteristics of the first speaker diaphragm assembly.

7. The electrostatic speaker driver of claim 1, wherein the first stator, the diaphragm, and the second stator each extend one hundred eighty degrees around the common central axis.

* * * * *